United States Patent [19]

Chung

[11] Patent Number: 4,994,198
[45] Date of Patent: Feb. 19, 1991

[54] ELECTRORHEOLOGICAL FLUIDS BASED ON SILICONE IONOMER PARTICLES

[75] Inventor: Kyuha Chung, Midland County, Mich.

[73] Assignee: Dow Corning Corporation, Midland, Mich.

[21] Appl. No.: 471,587

[22] Filed: Jan. 29, 1990

[51] Int. Cl.$^5$ ............................ H01B 3/20; C09K 3/00
[52] U.S. Cl. .................................. 252/78.3; 252/572; 252/573; 556/425
[58] Field of Search ............... 252/78.3, 75, 572, 573; 556/425

[56] References Cited

U.S. PATENT DOCUMENTS

| | | | |
|---|---|---|---|
| 4,645,614 | 2/1987 | Goossens et al. | 252/75 |
| 4,687,589 | 8/1987 | Block et al. | 252/73 |
| 4,702,855 | 10/1987 | Goossens et al. | 252/75 |
| 4,744,914 | 5/1988 | Filisko et al. | 252/74 |

FOREIGN PATENT DOCUMENTS

| | | |
|---|---|---|
| 63-033459 | 2/1988 | Japan . |
| 1139639 | 6/1989 | Japan . |
| 1180238 | 7/1989 | Japan . |
| 1180239 | 7/1989 | Japan . |
| 1180240 | 7/1989 | Japan . |
| 197595 | 8/1989 | Japan . |
| 1262942 | 10/1989 | Japan . |
| 1266193 | 10/1989 | Japan . |
| 1304188 | 12/1989 | Japan . |
| 1570234 | 6/1980 | United Kingdom . |
| 2217344A | 10/1989 | United Kingdom . |

Primary Examiner—A. Lionel Clingman
Assistant Examiner—Christine A. Skane
Attorney, Agent, or Firm—Alexander Weitz

[57] ABSTRACT

This invention relates to an electrorheological (ER) fluid composition comprising a suspension of a solid silicone ionomer in an electrically non-conducting liquid wherein the silicone ionomer is a reaction product of (I) an amine functional diorganopolysiloxane having a degree of polymerization of less than about 10,000 in which at least about 3 mole percent of the silicon atoms have attached thereto, through silicon-carbon bonds, an amine functional organic group bearing at least one —NHR″ group, in which R″ is selected from the group consisting of hydrogen and an alkyl radical having 1 to 6 carbon atoms; and (II) an acid.

17 Claims, 1 Drawing Sheet

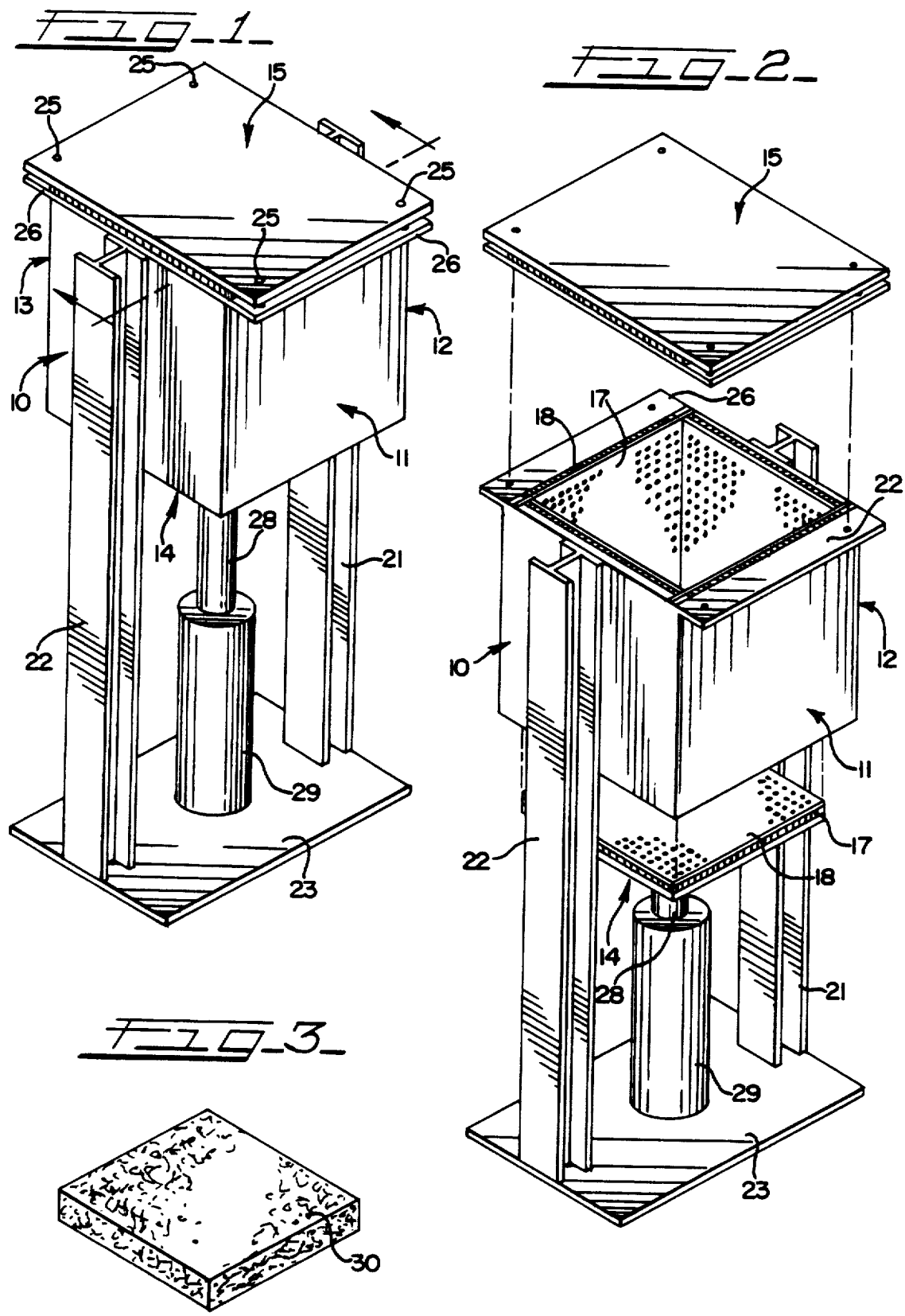

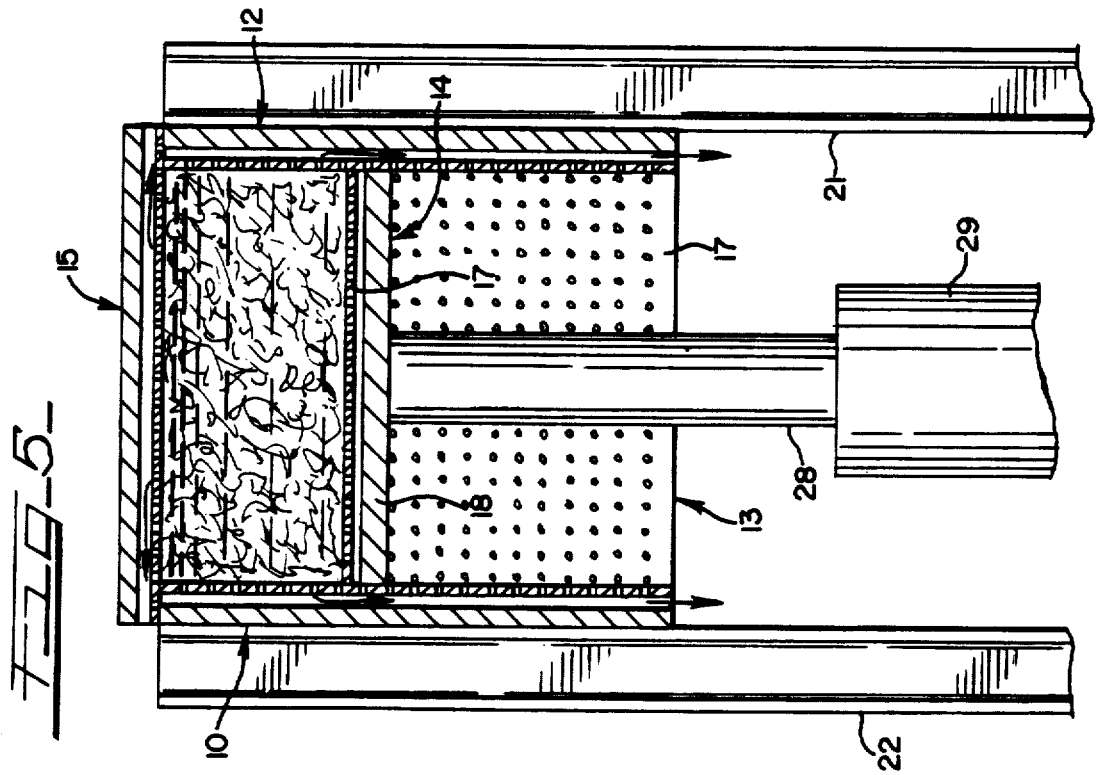
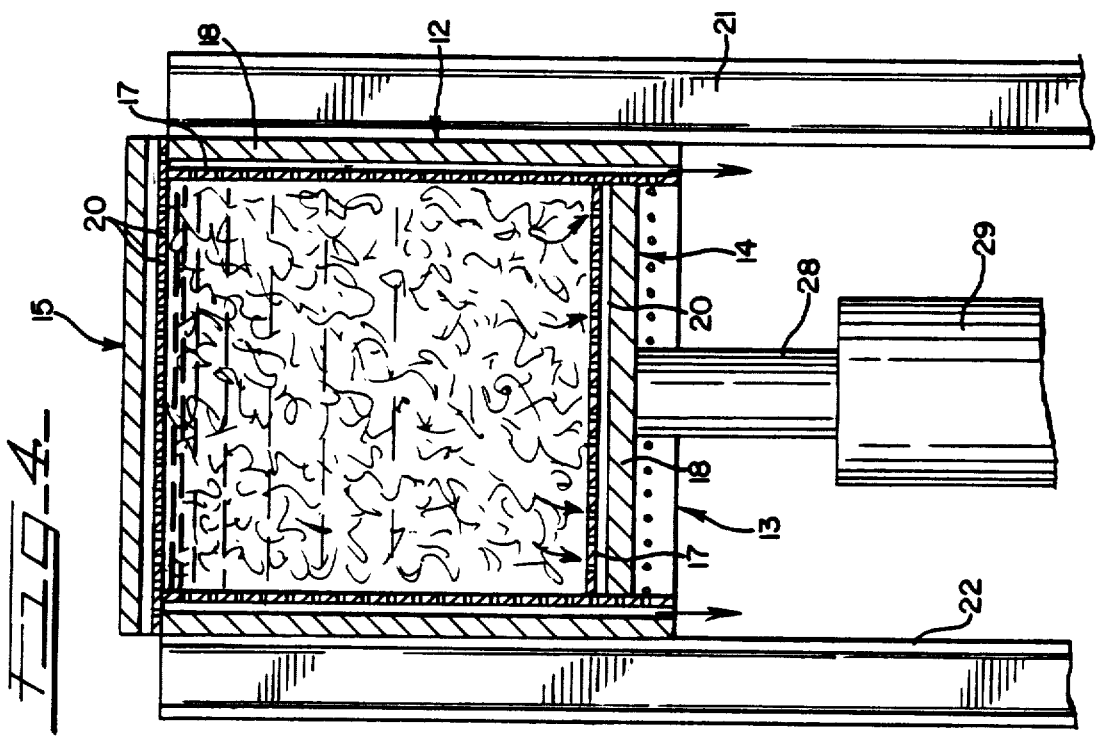

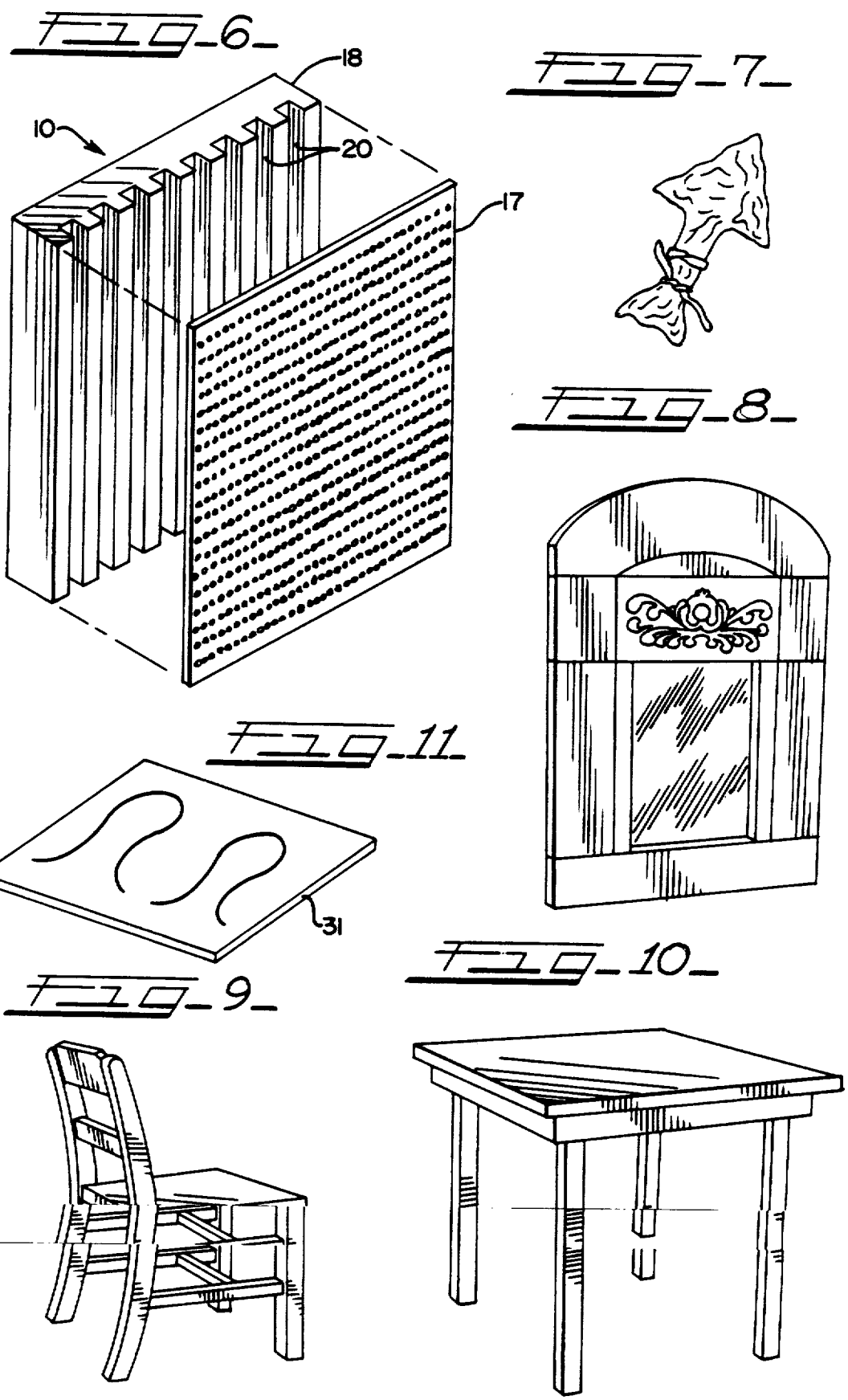

ELECTRORHEOLOGICAL FLUIDS BASED ON SILICONE IONOMER PARTICLES

This invention relates to an electrorheological (ER) fluid composition. More particularly, this invention relates to an electrorheological fluid comprising a suspension of a plurality of solid silicone ionomer particles in an electrically non-conducting liquid.

BACKGROUND OF THE INVENTION

When certain polarizable solid particles are dispersed in an electrically non-conducting hydrophobic liquid, the resulting suspensions exhibit peculiar rheological properties under the influence of an electric field. These systems show a dramatic increase in viscosity and modulus with applied voltage, in some cases literally being transformed from a liquid to a virtual solid upon the application of the electric field. This change is reversible and typically takes place in a matter of milliseconds. Materials which exhibit this phenomenon are called electrorheological (ER) or eletroviscous (EV) fluids, and have been known for at least the last fifty years. These fluids find utility in such areas as torque transfer and mechanical damping applications.

The early ER fluids comprised such systems as starch dispersed in transformer oil or silical gel dispersed in kerosine or mineral oil. Since these early discoveries, only a relatively small number of new systems, and improvements over old ones, have emerged in this art.

Thus, for example, Goossens et al., in U.S. Pat. Nos. 4,702,855 and 4,645,614, disclose ER fluids based on aluminum silicates in an electrically non-conducting liquid and silica gel in silicone oil, respectively. In each of these patents, the contribution to the art was an improved electroreactivity, as well as improved stability, over a wide temperature range. This end was accomplished by the addition of certain functional polysiloxane dispersants to the ER fluid formulations.

Unfortunately, the compositions of Goossens et al., cited supra, seem to rely on the adsorption of water onto the respective dispersed particles for their ER effect. Thus, the water content limits the upper use temperature of such fluids as it desorbs upon heating. This drawback was addressed by Filisko et al. in U.S. Pat. No. 4,744,914, which teaches an ER composition based on a particulate crystalline zeolite. The zeolite does not readily release water and allows the resulting ER fluids to be used at a typical temperature of about 120° C.

In addition to the above mentioned disadvantages, the presence of water in the dispersed phase of an ER fluid is generally undesirable since it can promote corrosion of metal parts as well as lead to excessive leakage current during operation, the latter being directly related to the power consumption of a given device. Leakage current is defined herein as the electrical current passing through the ER fluid when a given voltage is impressed across the fluid volume. The leakage current is often expressed as a current density in order to normalize this measurement with respect to device geometry.

Bloch et al., in U.S. Pat. No. 4,687,589, disclose ER systems wherein at least the dispersed phase is substantially anhydrous. These systems, which are based on organic conductors and semiconductors, are capable of operating as ER fluids and are said to result in reduced current densities relative to prior art fluids.

Other polymeric dispersed phases which are suitable for use in ER fluid compositions are described by Stangroom in Great Britain patent specification No. 1,570,234 (to the Secretary of State for Defense, London). This disclosure teaches electroviscous fluid compositions comprising various watercontaining polymers having free or neutralized acid groups dispersed in an electrically non-conducting oleaginous vehicle. The polymer must have a density of less than 1.8 g/cm$^3$ and have a specific degree of water absorbency in order to be suitable for the intended applications. Although these systems are stated to provide an enhanced electroviscous effect, they still suffer from the inclusion of a significant amount of water. Furthermore, a variety of acrylic-type polymers illustrate the invention but no silicone material is mentioned in GB No. 1,570,234 as a possible candidate for use as either the polymer or the oleaginous phase.

As can be seen from the above examples, most of the disclosures in the ER fluid art focus mainly on the dispersed phase. This seems to be the case since the constitution of the continuous phase is generally not critical as long as this fluid phase is an electrically non-conducting hydrophobic liquid. Thus, even though various silicone fluids, such as polydimethylsiloxane and fluorosilicone oil, have been employed in the art as the continuous phase, an all-silicone ER fluid has not as yet been disclosed, according to applicant's best knowledge.

SUMMARY OF THE INVENTION

It has now been discovered that certain silicone ionomers may be dispersed in an electrically non-conducting liquid to form fluid compositions which exhibit the electrorheological effect. These compositions offer distinct advantages over prior art systems since they do not contain abrasive particles, such as the above mentioned silicates and zeolites. Moreover, the compositions of the present invention do not contain significant amounts of water and thus do not rely on water for their ER character. They also have a much lower power consumption than previous ER fluids, the latter typically showing a leakage current density in the microampere/cm$^2$ range while the ER fluids of the present invention show a leakage current density in the nanoampere/cm$^2$ range. In this regard, the instant systems offer an added advantage in that the low leakage currents are also observed at elevated temperatures, again unlike prior art ER fluids. Finally, when the silicone ionomer is formulated with the proper electrically non-conducting liquid, such as a polydimethylsiloxane oil, the resulting all-silicone ER fluid can be effectively utilized at temperatures of up to about 210° C. This latter characteristic is believed to be at least partly due to the substantially anhydrous nature of such a system, although applicant does not wish to be bound to any particular theory or mechanism.

The present invention therefore relates to a composition comprising a homogeneous dispersion of (A) a silicone ionomer reaction product of
(I) an amine functional diorganopolysiloxane fluid having a degree of polymerization of less than about 10,000 wherein at least about 3 mole percent of the silicon atoms have attached thereto, through silicon-carbon bonds, an amine functional organic group bearing at least one —NHR" group, in which R" is selected from the group consisting of hydrogen and an alkyl radical having 1 to 6 carbon atoms; and (II) an acid, the quantity of said acid being at least sufficient to impart a solid character to said silicone ionomer at 25° C., in (B) an electrically non-conducting liquid.

BRIEF DESCRIPTION OF THE DRAWING

FIG. 1 is a plot of the dynamic complex modulus (G*) as a function of strain rate (radians/second) for a typical ER fluid of the invention. The particular fluid shown comprises a 33% by weight dispersion of a silicone ionomer powder based on an amine functional fluid having a total degree of polymerization of 6 in a polydimethylsiloxane oil having a viscosity of 100 cP. The leakage current density observed at each indicated voltage is also reported in nanoampere/cm$^2$ (nA/cm$^2$).

DETAILED DESCRIPTION OF THE INVENTION

The electrorheological fluid compositions of the present invention comprise a plurality of solid particles of (A) a silicone ionomer homogeneously dispersed in (B) an electrically non-conducting liquid. Silicone ionomer (A), in turn, is prepared by reacting (I) an amine functional diorganopolysiloxane with (II) an acid, as described infra.

Amine functional diorganopolysiloxane (I) is a cyclic or linear oligomer or polymer having a degree of polymerization (DP) of less than about 10,000 wherein at least about 3 mole percent of the silicon atoms of (I) have attached thereto, through silicon-carbon bonds, an amine functional organic group bearing at least one —NHR" group, in which R" is selected from the group consisting of hydrogen and an alkyl radical having 1 to 6 carbon atoms. The exact nature of the organic portion of the amine functional organic group is not critical to the operability of this invention, but said organic portion must exclude functionality which would react with the —NHR" groups thereon. Additionally, the organic portion of this group must also not react with the electrically non-conducting liquid, described infra. In other words, the organic portion of the amine functional organic group serves only as a structure to link the amine functionality thereof with the main body of diorganopolysiloxane (I) and is preferably chemically inert. Thus, for example, the organic portion of the amine functional organic group may be a divalent connecting group such as an aliphatic hydrocarbon group having at least three carbon atoms, such as trimethylene, or an arylene group, such as phenylene. In preferred embodiments of this invention, the amine functional organic group is —R'(NHCH$_2$CH$_2$)$_g$NR"H. In this formula, R" has its previously defined meaning and R' is a divalent hydrocarbon group having from 3 to 6 carbon atoms, such as trimethylene, tetramethylene or isobutylene. Preferably, R' is trimethylene or isobutylene. R" has been defined above and is preferably hydrogen, and g is an integer having a value from zero to 4. Preferably, g is one.

It is further preferred that the amine functional diorganopolysiloxane (I) is a linear copolymer represented by the average formula $$R_2QSiO(RSiO)_ySiQR_2 \quad \text{(i)}$$
$$\phantom{R_2QSiO(R}|$$
$$\phantom{R_2QSiO(RSiO)_yS}Q$$

wherein R is a non-reactive group which may be independently selected from alkyl radicals having 1-6 carbon atoms, such as methyl, ethyl, propyl, butyl, isopropyl or hexyl radicals. The R group may also be selected from monovalent cycloaliphatic radicals, such as cyclopentyl, cyclohexyl, or cyclooctyl radicals. Alternatively, R can be an aryl group such as phenyl, benzyl, styryl, tolyl and xenyl. Still further, R may be a monovalent halohydrocarbyl group having 1 to 6 carbon atoms such as 3,3,3-trifluoropropyl, 3-chloropropyl or perfluorobutylethyl. Finally, R may be a monovalent haloaromatic group such as 2,4-dichlorophenyl. It is preferred that R is selected from methyl, phenyl or 3,3,3-trifluoropropyl radicals. In formula (i), Q may be independently selected from the aforementioned group R or the above described amine functional organic group —R'(NHCH$_2$CH$_2$)$_g$NR"H and y has a value sufficient to provide at least 3 mole percent of Q groups to the diorganopolysiloxane linear copolymer. In formula (ii), the value of y is selected so as to meet the above stated limitations (i.e., the total DP of the copolymer is less than about 10,000 and the molar content of Q is at least 3%).

When Q of formula (i) is an amine functional organic group, it is preferred that this group is selected from the group consisting of $$-CH_2CH_2CH_2NCH_2CH_2NH_2$$
$$\phantom{-CH_2CH_2CH_2}|$$
$$\phantom{-CH_2CH_2CH_2}H$$

$$-CH_2CH_2CH_2NH_2$$

$$-CH_2CH_2CH_2NH(CH_3) \text{ and}$$

$$-CH_2CH(CH_3)CH_2NH(CH_3)$$

while the most preferred Q group is Q', which may be represented by the formula $$-CH_2CH(CH_3)CH_2NCH_2CH_2NH_2 \quad \text{(Group Q')}$$
$$\phantom{-CH_2CH(CH_3)CH_2}|$$
$$\phantom{-CH_2CH(CH_3)CH_2}H$$

Highly preferred amine functional linear diorganopolysiloxanes of this invention have the structure $$Me_3SiO(Me_2SiO)_x(MeSiO)_ySiMe_3 \quad \text{(ii)}$$
$$\phantom{Me_3SiO(Me_2SiO)_x(Me}|$$
$$\phantom{Me_3SiO(Me_2SiO)_x(Me}Q'$$

wherein Me hereinafter denotes a methyl radical and Q' has been defined above. Again, in formula (ii), the values of x and y are selected so as to meet the above stated limitations (i.e., the total DP of the copolymer is less than about 10,000 and the molar content of Q' is at least 3%). It is highly preferred that the total DP of the copolymer of formula (ii) is less than about 400 and the molar content of Q' is 10% to 70%.

Alternatively, the amine functional diorganopolysiloxanes (I) may be a mixture of cyclic species represented by the general formula $$(RSiO)_c \quad \text{(iii)}$$
$$\phantom{(RS}|$$
$$\phantom{(RSi}Q$$

wherein c is an integer having a value of 4 to about 6 and Q and R have their above defined meanings. It is also contemplated that mixed cyclics, containing both the amine functional siloxy units expressed by formula (iii) as well as diorganosiloxy units, are within the scope of the present invention.

The amine functional diorganopolysiloxanes of this invention are well known in the art and some of them are available commercially. There is thus no need for a detailed description of their preparation herein.

The acid (II), which is reacted with the above described component (I) to form the silicone ionomer (A) of the present invention, may be an organic or inorganic acid such as acetic, formic, boric, nitric, sulfuric, phosphoric, hydrochloric, perchloric, and the like. Preferably, the acid is selected from the group consisting of phosphoric, nitric, sulfuric and hydrochloric acid, most preferably sulfuric.

In order to form the silicone ionomer (A), the acid (II) is reacted with the amine functional diorganopolysiloxane (I) at ambient temperature, a sufficient quantity of the acid being used to result in an ionomer which is a solid at room temperature (i.e., at about 25° C.). The preferred procedure comprises mixing a dispersion or solution of component (I) in a nonpolar organic solvent and a dispersion or solution of component (II) in the same solvent to obtain a precipitate of the solid ionomer. Examples of suitable solvents include acetone, toluene, xylene, methylene choride, tetrahydrofuran, acetone being preferred. It has been found that precipitation from an aqueous dispersion of the reactants is possible but results in ER fluids which exhibit inferior electrorheological response and have greater leakage currents than when the above mentioned organic solvents are employed. After reaction, the precipitated ionomer is preferably washed several times with additional solvent and dried under vacuum at elevated temperature (e.g., 50° to 100° C.). Alternatively, a dispersion of the ionomer precipitate may be processed by a conventional spray drying technique to produce the finished solid silicone ionomer.

As alluded to above, the amount of acid that is used to react with the amine functional diorganopolysiloxane (I) may be determined by the skilled artisan by routine experimentation. The quantity of acid (II) required is at least an amount sufficient to produce a solid ionomer product. Thus, for example in the case of sulfuric acid and the above highly preferred amine functional linear diorganopolysiloxanes of formula (ii), the molar ratio of the amine functional organic group Q' to the acid is preferably between about 0.3:1 and about 2:1, most preferably about 1:1.

ER fluids based on the above described silicone ionomer (A) may be prepared be uniformly dispersing a plurality of the solid ionomer particles in an electrically non-conducting liquid (B). The electrically non-conducting liquid may be selected from any of the known liquid vehicles (i.e., the continuous medium) used to prepare current art ER fluids. Thus, for example, it may be an organic oil, such as mineral oil, a polychlorinated biphenyl, castor oil, a fluorocarbon oil, linseed oil, and the like. The electrically non-conducting liquid may alternatively be a silicone oil, such as polydimethylsiloxane, polymethyltrifluoropropylsiloxane, a polymethylalkylsiloxane, polyphenylmethylsiloxane, and the like. The liquids used as component (B) preferably have a viscosity of about 5 to about 10,000 cP at 25° C. It is highly preferred that the electrically non-conducting liquid is polydimethylsiloxane having a viscosity at 25° C. of about 10 to 1,000 cP at 25° C.

Dispersion of the solid silicone ionomer (A) in the liquid (B) is preferably accomplished by any of the commonly accepted methods, such as those employing a ball mill, paint mill, high shear mixer, inter alia. During this dispersion process, the ionomer particles and the electrically non-conducting liquid are sheared at a high rate, thereby reducing the size of the particles to a point where they form a stable suspension in the liquid medium. It has been found that a final particle size having an average diameter of about 5 to 100 micrometers is preferred. If the diameter is above this range, the particles tend to settle out, while if the diameter is too low, thermal Brownian motion of the particles tends to reduce the ER effect.

An equivalent dispersion of the ionomer in the electrically non-conducting liquid may also be effected by first grinding the particles to a suitable fineness and subsequently mixing in the liquid component.

Typically, from about 5 to about 40 weight percent of the silicone ionomer (A) particles is dispersed in the electrically non-conducting liquid. However, the optimum amount that is used depends greatly on the specific ionomer, liquid type, liquid viscosity and intended application, among other variables. Those skilled in the art will readily determine the proper proportions in any given system by routine experimentation.

The ER fluid compositions of the present invention may further comprise antioxidants, stabilizers, colorants and dyes.

Electrorheological fluids of this invention find utility in many of the applications now being serviced by current art ER fluid compositions. Examples of this diverse utility include torque transfer applications, such as traction drives, automotive transmissions and anti-lock brake systems, mechanical damping applications, such as active engine mounts, shock absorbers and suspension systems, and applications where controlled stiffening of a soft member is desired, such as hydraulic valves having no moving parts, robotic arms and penile implants. The compositions of the present invention find particular utility in applications requiring a non-abrasive ER fluid which is capable of sustained operation at elevated temperature (e.g., up to about 210° C.), such as engine mounts and various mechanical and acoustic damping devices.

EXAMPLES

The following examples are presented to further illustrate the compositions of this invention, but are not to be construed as limiting the invention, which is delineated in the appended claims. All parts and percentages in the examples are on a weight basis, unless indicated to the contrary.

EXAMPLE 1

An amine functional hydrolyzate, consisting essentially of a mixture of cyclic species having the formula

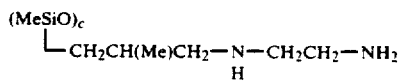

wherein Me hereinafter denotes a methyl radical and c is 4 to about 6, was prepared. For each part of a silane having the formula

0.25 part of water was used in a hydrolysis procedure wherein this mixture was heated to about 130° C. as the byproduct, methanol, was stripped off. The product was additionally stripped under vacuum for one hour at about 130° C. This procedure also resulted in the formation of about 5% to 10% of hydroxyl terminated linear species.

To a 2,000 ml three-necked flask equipped with a stirrer, thermometer and nitrogen purge, there was added 471 grams of decamethyltetrasiloxane and 529 grams of the above described amine functional hydrolyzate. To this mixture, there was added a potassium silanolate equilibration catalyst (1.45 milliequivalents of K+) and the contents of the flask were heated to 150° C. for about 6 hours using a nitrogen purge. The equilibrated product was cooled to about 40° C. and the basic catalyst neutralized with 0.10 grams (1.6 milliequivalents) of acetic acid. The product was then stripped under vacuum at 150° C. and filtered. A 6 DP (i.e., total degree of polymerization, including end groups) fluid having 33 mole percent amine functional siloxane units and the following calculated average structure was obtained

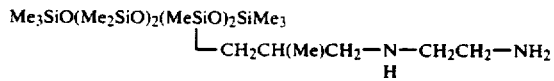

EXAMPLE 2

A procedure similar to that used in Example 1 was followed wherein 43.3 grams of decamethyltetrasiloxane, 802.5 grams of the amine functional hydrolyzate used in Example 1 and 654 grams of a mixture of polycyclodimethylsiloxanes having a degree of polymerization between 3 and about 7 were equilibrated 140°-150° C. for about six hours. After equilibration, the product was allowed to cool to 100° C., whereupon it was neutralized with glacial acetic acid, stirred for two hours and filtered after being allowed to stand overnight. The resulting 100 DP fluid, having 33 mole percent amine functional siloxane units, had the following calculated average structure

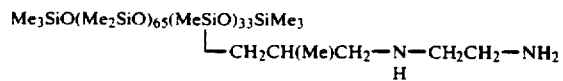

EXAMPLE 3

A procedure similar to that used in Example 2 was followed wherein a mixture of 21.7 grams of decamethyltetrasiloxane, 804 grams of the amine functional hydrolyzate used in Example 1 and 675 grams of a mixture of polydimethylcyclosiloxanes having a degree of polymerization between 3 and about 7 was equilibrated by heating with 1.5 grams of KOH pellets. After heating the reaction mixture at 146°-157° C. for about six hours, it was allowed to cool to 100° C., whereupon it was neutralized with 1.0 cc of glacial acetic acid, stirred for two hours and filtered (not stripped) after being allowed to stand overnight. The resulting 200 DP fluid, having 33 mole percent amine functional siloxane units, had the following calculated average structure

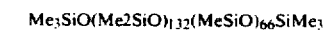
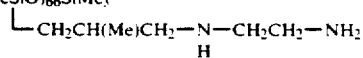

EXAMPLE 4

A procedure similar to that used in Example 1 was followed to produce a 400 DP amine functional fluid having 10 mole percent amine functional siloxane units and the calculated average structure

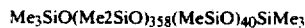
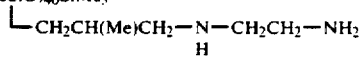

EXAMPLE 5

A procedure similar to that used in Example 1 was followed to produce a 400 DP fluid having 4.5 mole percent amine functional siloxane units and the following calculated average structure

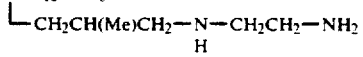

The above Examples 1-5 illustrate the preparation of various DP amine functional siloxane fluids which are reacted with acids to form the compositions of the present invention, shown infra.

EXAMPLE 6

Thirty grams of the 200 DP amine functional fluid of Example 3 were dissolved in 1,000 ml of acetone and a solution of concentrated sulfuric acid in acetone (8.83 grams $H_2SO_4$ in 400 ml of acetone) was added thereto over the course of 90 minutes as the mixture was stirred vigorously. This proportion of the ingredients corresponds to equimolar portions of sulfuric acid and the amine functional group of the siloxane having the structure

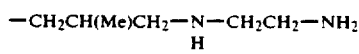

After stirring for one more hour, the resulting suspension was centrifuged at 1,000 r.p.m. for 20 minutes. The suspended solids were then washed by re-dispersing them in 400 ml of acetone and followed by centrifugation. This washing procedure was repeated two more times using 800 ml portions of acetone. Finally, the washed solids were dried overnight in a vacuum oven at 65° C. at <1 mm Hg to obtain a slightly yellow, friable powder. This example illustrates the preparation of the silicone ionomer powder of the present invention. Other such powders were prepared by a similar procedure from amine functional siloxane fluids having various degrees of polymerization.

EXAMPLE 7

Five grams of the silicone ionomer powder of Example 6 were ground to a fine powder using a mortar and pestle, whereupon ten grams of a trimethylsiloxy terminated polydimethylsiloxane oil having a viscosity of 100 cP at 25° C. were added to the mortar and the combination further ground to obtain a uniform dispersion (33 weight percent silicone ionomer in the polydimethylsiloxane oil). This dispersion was placed in a vacuum oven to remove entrained air and then dried in a forced air oven at 120° C. for 30 minutes to produce a yellowish, opaque fluid. This example illustrates the preparation of an electrorheological (ER) fluid of the present invention. Other ER fluids were prepared in a similar manner, wherein different silicone ionomer powders were dispersed in both polydimethylsiloxane and mineral oils, as shown in Tables 1 to 4, below.

ELECTRORHEOLOGICAL TEST PROCEDURE

A Rheometrics RDS-II Dynamic Mechanical Spectrometer was modified to allow high voltages to be applied across its oscillating parallel plates. A Hippotronics R10B power supply provided the voltage and a Kiethley Instruments Model 485 digital picoammeter, connected in series with the plates and the power supply, was used to measure leakage current through the ER fluid sample. For safety reasons, a 50 megaohm resistor was also connected in series with the power supply in order to reduce total current of the system. The applied voltage from the power supply was then corrected for the potential drop across the resistor to obtain the true voltage across the ER fluid sample. Current density through the ER fluid was calculated from the value of total current measured by dividing by the area of one of the parallel plates (19.625 cm$^2$).

Dynamic complex modulus (G*) of the test fluids was measured as a function of oscillatory strain rate in the range of 0.5 to 500 radians per second (rad/sec) using a plate gap of about 1 mm. A strain of 0.1% resulted in measurements which were, with minor exceptions, in the linear region (i.e., the measured properties were independent of the oscillation angle) and was used throughout. Only at the low frequencies (e.g., 0.5 to about 10 rad/sec) and for samples which were not subjected to electrical potential, did the torque levels observed approach the capability limits of the RDS-II force transducer; such measurements may be of questionable accuracy.

Tests were conducted at room temperature (23° C.) and at elevated temperature (125° C.) using several different applied voltages in each series of tests.

A typical plot of the dynamic complex modulus versus strain rate (at 23° C.) is shown in FIG. 1 for the case of a 33% dispersion of a silicone ionomer powder based on the 6 DP amine functional fluid of Example 1 in 100 cP polydimethylsiloxane oil. As can be seen from the figure, a dramatic increase of complex modulus resulted from the imposition of an electrical potential across the ER fluid regardless of the test frequency. Moreover, the current density was quite low, ranging between 0.01 and 0.36 nanoampere/cm$^2$ (nA/cm$^2$).

Table 1 shows additional test results for similar ER fluids based on amine functional siloxane fluids having a DP range of 6 to 400. In FIG. 1 and Table 1, the silicone ionomer powders were prepared from amine functional fluids which were reacted with sulfuric acid at a 1:1 molar ratio of sulfuric acid to the above described amine (i.e., having the structure

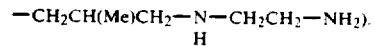

In each case, the respective silicone ionomer powder was dispersed in trimethylsiloxy terminated polydimethylsiloxane oil having a viscosity of 100 cP at 25° C. In Table 1, the first two columns define the structure of the amine functional silicone fluid used to prepare the silicone ionomer powder while the third column indicates the weight percent of the ionomer dispersed in the polydimethylsiloxane oil. The last row of Table 1 shows rheological data for the amine functional hydrolyzate of used to prepare the amine functional fluids of above examples.

In all the tables presented infra, the standard notation "E+Oj" is used to indicate multiplication of the preceding value by 10$^j$ (e.g., 1.0 E+02 is equivalent to $1.0 \times 10^2$).

TABLE 1

| AMINE FUNCTIONAL SILCONE FLUID | | WEIGHT % OF SILICONE IONOMER IN POLYDIMETHYLSILOXANE OIL | RHEOLOGICAL TEST RESULTS TESTED AT 23° C. | | | |
|---|---|---|---|---|---|---|
| DP | MOLE % OF AMINE GROUPS | | SAMPLE VOLTAGE (KV/mm) | CURRENT DENSITY (nA/cm$^2$) | G* AT 13 RAD/SEC (Pa) | G* AT 500 RAD/SEC (Pa) |
| 6 | 33 | 33 | 0 | 0 | ** | 7.0 E + 02 |
|  |  |  | 2 | 0.12 | 9.8 E + 04 | 1.7 E + 05 |
|  |  |  | 6 | 0.77 | 2.8 E + 05 | 3.6 E + 05 |
| 100 | 33 | 30 | 0 | 0 | ** | 5.6 E + 02 |
|  |  |  | 3.5 | 0.011 | 1.6 E + 05 | 1.9 E + 05 |
|  |  |  | 6.1 | 0.097 | 2.3 E + 05 | 3.0 E + 05 |
| 200 | 33 | 30 | 0 | 0 | 1.4 E + 02 | 1.4 E + 03 |
|  |  |  | 2.9 | 0.087 | 1.3 E + 05 | 2.2 E + 05 |
|  |  |  | 5.0 | 0.18 | 2.4 E + 05 | 3.1 E + 05 |
| 400 | 4.5 | 33 | 0 | 0 | 5.2 E + 02 | 1.4 E + 03 |
|  |  |  | 2.9 | 0.01 | 4.9 E + 03 | 8.0 E + 03 |
|  |  |  | 5.8 | 0.09 | 9.2 E + 03 | 1.3 E + 04 |
| 400 | 10 | 33 | 0 | 0 | ** | ** |
|  |  |  | 2.0 | 0.41 | 1.7 E + 04 | 2.3 E + 04 |
|  |  |  | 4.0 | 3.3 | 4.2 E + 04 | 5.6 E + 04 |
|  |  |  | 6.0 | 7.6 | 6.9 E + 04 | 1.0 E + 05 |
| Hydrolyzate (see Example 1) | ≈100 | 33 | 0 | 0 | 1.8 E + 02 | 1.1 E + 03 |
|  |  |  | 2.0 | 0.38 | 1.1 E + 05 | 1.6 E + 05 |
|  |  |  | 6.0 | 5.5 | 2.4 E + 05 | 4.4 E + 05 |

| RHEOLOGICAL TEST RESULTS TESTED AT 125° C. | | | |
|---|---|---|---|
| SAMPLE VOLTAGE | CURRENT DENSITY | G* AT 13 RAD/SEC | G* AT 500 RAD/SEC |

TABLE 1-continued

| | DP | (KV/mm) | (nA/cm²) | (Pa) | (Pa) |
|---|---|---|---|---|---|
| | 6 | 0 | 0 | ** | ** |
| | | 2 | 0.039 | 1.5 E + 04 | 2.8 E + 04 |
| | | 5.9 | 0.097 | 1.1 E + 05 | 1.4 E + 05 |
| | 100 | 0 | 0 | ** | 4.6 E + 02 |
| | | 3.6 | 0.027 | 5.5 E + 04 | 7.7 E + 04 |
| | | 6.3 | 0.066 | 7.5 E + 04 | 1.1 E + 05 |
| | 200 | 0 | 0 | ** | 4.4 E + 02 |
| | | 3.1 | 0.13 | 5.8 E + 04 | 8.6 E + 04 |
| | | 6.1 | 0.18 | 1.1 E + 05 | 1.5 E + 05 |
| | 400 | 0 | 0 | ** | ** |
| | | 2.1 | 0.056 | 6.1 E + 02 | 1.4 E + 03 |
| | | 5.2 | 0.092 | 1.2 E + 03 | 7.4 E + 02 |
| | 400 | 0 | 0 | ** | 2.3 E + 02 |
| | | 2.1 | 0.097 | 2.4 E + 02 | 5.5 E + 02 |
| | | 6.3 | 0.035 | 8.2 E + 03 | 1.1 E + 04 |
| | Hydrolyzate | 0 | 0 | ** | 6.0 E + 02 |
| | (see Example | 2.0 | 2.5 | 4.4 E + 03 | 6.1 E + 03 |
| | 1) | 3.0 | 15 | 1.5 E + 04 | 2.0 E + 04 |

**Reading too low for Transducer

Other silicone ionomer powders were prepared by the above methods by reacting an amine functional fluid react with the amine functional silicone fluids to produce ER fluids.

TABLE 2

| ACID REACTED WITH 100 DP AMINE FUNCTIONAL SILICONE FLUID | RHEOLOGICAL TEST RESULTS | | | | | | | |
|---|---|---|---|---|---|---|---|---|
| | TESTED AT 23° C. | | | | TESTED AT 125° C. | | | |
| | SAMPLE VOLTAGE (KV/mm) | CURRENT DENSITY (nA/cm²) | G* AT 13 RAD/ SEC (Pa) | G* AT 500 RAD/ SEC (Pa) | SAMPLE VOLTAGE (KV/mm) | CURRENT DENSITY (nA/cm²) | G* AT 13 RAD/ SEC (Pa) | G* AT 500 RAD/ SEC (Pa) |
| NITRIC | 0 | 0 | ** | 1.9 E + 02 | 0 | 0 | ** | 2.0 E + 02 |
| | 1.4 | 0.99 | 1.9 E + 03 | 8.0 E + 03 | 1.4 | 3.7 | ** | 3.8 E + 02 |
| | 2.7 | 6.4 | 8.6 E + 03 | 2.7 E + 04 | 2.8 | 19 | 1.1 E + 03 | 3.3 E + 03 |
| HYDROCHLORIC | 0 | 0 | 8.0 E + 02 | 1.4 E + 03 | 0 | 0 | 2.8 E + 02 | 9.9 E + 02 |
| | 2.1 | 1.1 | 3.5 E + 03 | 1.3 E + 04 | 0.87 | 0.56 | 8.1 E + 02 | 3.4 E + 03 |
| | 3.5 | 4.1 | 1.0 E + 04 | 3.5 E + 04 | 2.6 | 11 | 3.1 E + 03 | 1.5 E + 04 |
| ACETIC | 0*** | 0 | 3.1 E + 02 | 1.5 E + 03 | 0 | 0 | 4.9 E + 02 | 6.6 E + 02 |
| | 1.4*** | 1.6 | 5.5 E + 02 | 2.2 E + 03 | 0.95 | 0.77 | 4.6 E + 02 | 8.7 E + 02 |
| | 2.0*** | 4.9 | 6.9 E + 02 | 2.5 E + 03 | 1.9 | 5.1 | 1.3 E + 02 | 3.7 E + 02 |

**Reading too low for transducer
***Test Temperature was 24° C.

having the average structure

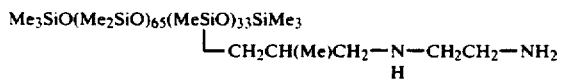

Me₃SiO(Me₂SiO)₆₅(MeSiO)₃₃SiMe₃
         |
         CH₂CH(Me)CH₂—N—CH₂CH₂—NH₂
                      |
                      H with the acids indicated in the first column of Table 2.

To illustrate the effect of the mole ratio of amine functional silicone fluid to acid, the 200 DP fluid of Example 3 was reacted with sulfuric acid, as described above, in the ratios shown in the first column of Table 3. Resulting ionomer powders were dispersed in the 100 cP polydimethylsiloxane oil at a concentration of 33 weight percent and tested as before.

TABLE 3

| MOLE RATIO OF AMINE GROUP: SULFURIC ACID | RHEOLOGICAL TEST RESULTS | | | | | | | |
|---|---|---|---|---|---|---|---|---|
| | TESTED AT 23° C. | | | | TESTED AT 125° C. | | | |
| | SAMPLE VOLTAGE (KV/mm) | CURRENT DENSITY (nA/cm²) | G* AT 13 RAD/ SEC (Pa) | G* AT 500 RAD/ SEC (Pa) | SAMPLE VOLTAGE (KV/mm) | CURRENT DENSITY (nA/cm²) | G* AT 13 RAD/ SEC (Pa) | G* AT 500 RAD/ SEC (Pa) |
| 1:0.3 | 0 | 0 | ** | 2.8 E + 02 | 0 | 0 | ** | 1.5 E + 02 |
| | 3.5 | 0.18 | 2.0 E + 04 | 6.4 E + 04 | 3.6 | 0.21 | 1.8 E + 04 | 3.5 E + 04 |
| | 6.2 | 0.22 | 3.6 E + 04 | 8.8 E + 04 | 6.3 | 0.077 | 4.6 E + 04 | 8.4 E + 04 |
| 1:0.5 | 0 | 0 | ** | 1.1 E + 03 | 0 | 0 | ** | ** |
| | 1.6 | 0.02 | 5.1 E + 04 | 1.1 E + 05 | 3.1 | 0.077 | 2.0 E + 04 | 3.9 E + 04 |
| | 4.9 | 1.1 | 9.0 E + 04 | 1.7 E + 05 | 5.5 | 0.39 | 5.3 E + 04 | 8.2 E + 04 |
| 1:1.5 | 0 | 0 | ** | 5.1 E + 02 | 0 | 0 | 1.1 E + 02 | 7.5 E + 02 |
| | 3.6 | 4.3 | 1.2 E + 05 | 1.7 E + 05 | 1.9 | 0.30 | 1.1 E + 03 | 4.8 E + 03 |
| | 6.3 | 1.8 | 1.5 E + 05 | 2.4 E + 05 | 5.7 | 1.4 | 2.1 E + 03 | 6.9 E + 03 |

**Reading too low for transducer

As before, the mole ratio of amine groups to acid used was 1:1 in each case. The ionomer powders were again dispersed in the 100 cP polydimethylsiloxane oil at a concentration of 25 weight percent and tested at 23° C. and 125° C., as above. The results shown in Table 2 illustrate the wide range of acids which may be used to A mineral oil (Merck Index 10,7048 from Aldrich Chemical Co., Milwaukee, Wis.) was used as the continuous fluid medium to prepare an ER fluid based on the amine functional fluid of Example 2 which was reacted with sulfuric acid at a mole ratio of amine group to acid of 1:1, as described above. The silicone ionomer powder was dispersed in the mineral oil at a concentration of 29 weight percent using a ball mill instead of the mortar and pestle method described above. The ER fluid was tested, as above, at 23° C. and 125° C., the results being presented in Table 4.

TABLE 4

| | Rheological Test Results | | | |
|---|---|---|---|---|
| Temperature (°C.) | Sample Voltage (KV/mm) | Current Density (nA/cm²) | G* at 13 rad/sec (Pa) | G* at 500 rad/sec (Pa) |
| 23 | 0 | 0 | ** | 1.1 E + 03 |
| 23 | 2.0 | 1.7 | 4.5 E + 04 | 7.1 E + 04 |
| 23 | 4.0 | 2.9 | 9.2 E + 04 | 1.1 E + 05 |
| 23 | 6.0 | 7.6 | 1.2 E + 05 | 1.6 E + 05 |
| 125 | 0 | 0 | ** | ** |
| 125 | 2.0 | 13 | 1.4 E + 04 | 1.9 E + 04 |
| 125 | 4.0 | 76 | 4.3 E + 04 | 5.6 E + 04 |

**Reading too low for transducer.

An 80 DP fluorosilicone oil having 50 mole percent dimethylsiloxy units and 50 mole percent siloxy units of the formula

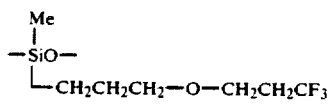

was used as the continuous fluid medium to prepare an ER fluid. The silicone ionomer used was based on the amine functional fluid of Example 2 which had been reacted with sulfuric acid at a mole ratio of amine group to acid of 1:1, as described above. This silicone ionomer powder was dispersed in the fluorosilicone oil at a concentration of 25 weight percent. The ER fluid was tested, as above, at 23° C., the results being presented in Table 5.

TABLE 5

| | Rheological Test Results | | | |
|---|---|---|---|---|
| Temperature (°C.) | Sample Voltage (KV/mm) | Current Density (nA/cm²) | G* at 13 rad/sec (Pa) | G* at 500 rad/sec (Pa) |
| 23 | 0 | 0 | ** | 2.2 E + 03 |
| 23 | 2.0 | 15 | 1.1 E + 02 | 3.8 E + 03 |
| 23 | 4.0 | 41 | 2.5 E + 02 | 6.8 E + 03 |
| 23 | 5.3 | 27 | 8.9 E + 02 | 1.3 E + 04 |

**Reading too low for transducer

For comparison purposes, a control fluid was prepared by dispersing a 33 weight percent of a 200 DP amine functional silicone fluid having the average structure

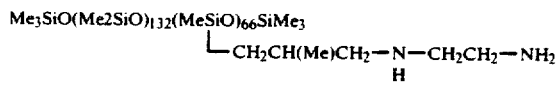

in the 100 cP polydimethylsiloxane oil (i.e., the amine functional silicone fluid was not reacted with an acid). The rheological evaluation of this fluid blend showed essentially no ER effect and all readings obtained (up to 5 KV/mm) were too low for the transducer.

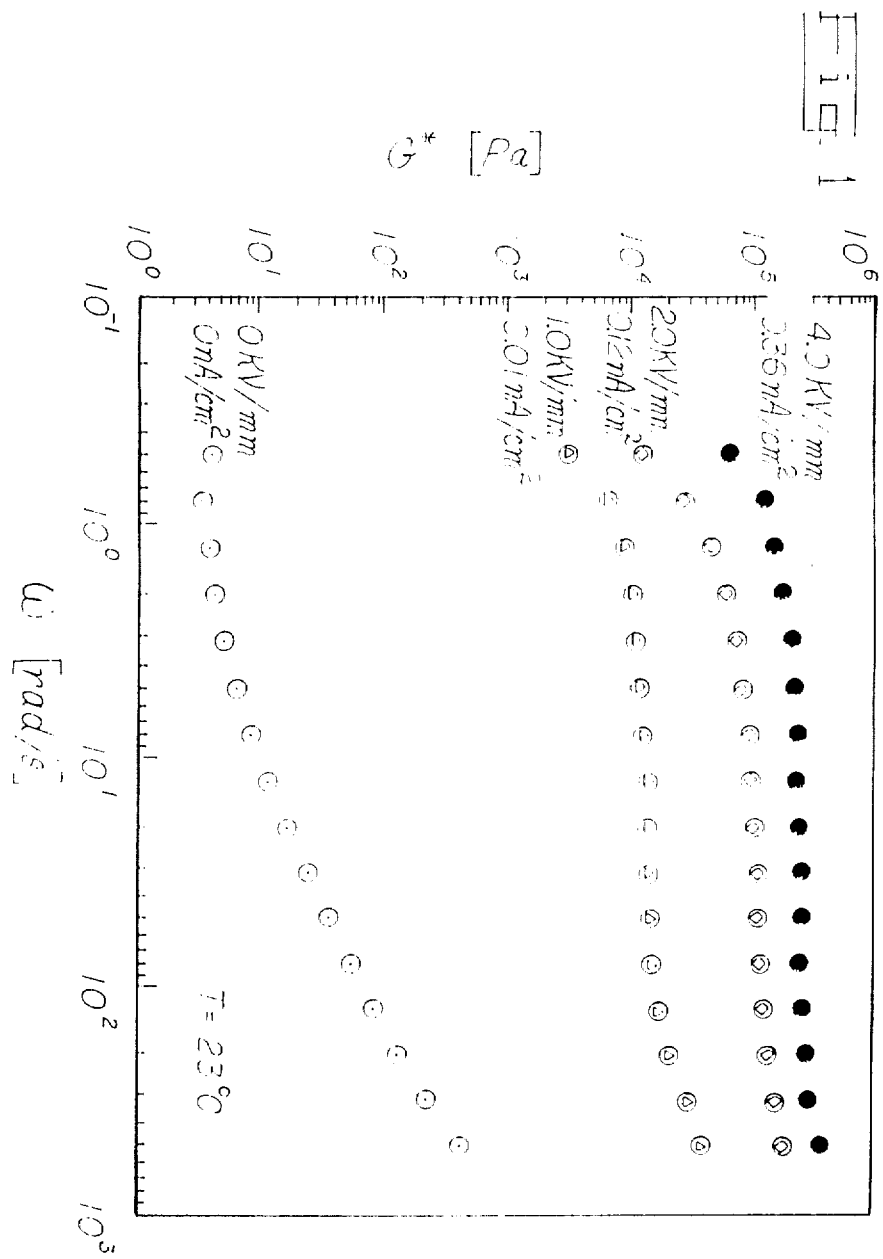

I claim:

1. In an electrorheological fluid comprising a dispersion of a plurality of solid particles in an electrically non-conducting liquid, the improvement comprising using as said solid particles a silicone ionomer reaction product of (I) an amine functional diorganopolysiloxane having a degree of polymerization of less than about 10,000 wherein at least about 3 mole percent of the silicon atoms have attached thereto, through silicon-carbon bonds, an amine functional organic group bearing at least one -NHR" group, in which R" is selected from the group consisting of hydrogen and an alkyl radical having 1 to 6 carbon atoms; and (II) an acid, the quantity of said acid being at least sufficient to impart a solid character to said silicone ionomer at 25° C.

2. The composition according to claim 1, wherein said acid (II) is selected from the group consisting of phosphoric, hydrochloric, nitric and sulfuric acid.

3. The composition according to claim 2, wherein the organic groups of said amine functional diorganopolysiloxane (I) are all methyl radicals and said acid (II) is sulfuric acid.

4. A composition comprising a homogeneous dispersion of (A) a silicone ionomer reaction product of (I) an amine functional diorganopolysiloxane fluid having a degree of polymerization of less than about 10,000 wherein at least about 3 mole percent of the silicon atoms have attached thereto, through silicon-carbon bonds, an amine functional organic group bearing at least one -NHR" group, in which R" is selected from the group consisting of hydrogen and an alkyl radical having 1 to 6 carbon atoms; and (II) an acid, the quantity of said acid being at least sufficient to impart a solid character to said silicone ionomer at 25° C., in (B) an electrically non-conducting liquid.

5. The composition according to claim 4, wherein said amine functional diorganopolysiloxane fluid (I) has the average general formula

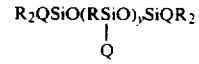

wherein R is independently selected from the group consisting of alkyl, cycloalkyl, haloalkyl, aromatic and haloaromatic radicals and Q is independently selected from the group consisting of said R and an amine functional group having an average structure selected from the group consisting of $-R'(NHCH_2CH_2)_gNR"H$ and $-R'NR"H$, in which R" has its previously defined meaning, R' is a divalent hydrocarbon group having from 3 to 6 carbon atoms and g is an integer between 1 and 4, inclusive and wherein y is selected so as to provide a total degree of polymerization of said diorganopolysiloxane fluid of less than about 10,000 and a molar content of Q of at least 3%.

6. The composition of claim 5, wherein R of said amine functional diorganopolysiloxane fluid (I) is independently selected from the group consisting of methyl, phenyl and 3,3,3-trifluoropropyl radicals.

7. The composition of claim 6, wherein said Q group is selected from the group consisting of the structures

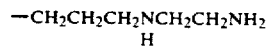

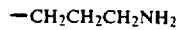

-continued

—CH₂CH(CH₃)CH₂NH(CH₃)

and

—CH₂CH(CH₃)CH₂NCH₂CH₂NH₂
              |
              H

8. The composition according to claim 7, wherein said acid (II) is selected from the group consisting of phosphoric, hydrochloric, nitric and sulfuric acid.

9. The composition according to claim 8, wherein said amine functional diorganopolysiloxane fluid (I) has the average structure

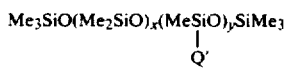

wherein Me denotes a methyl radical and the values of x and y are selected such that the total degree of polymerization of said fluid (I) is less than about 400 and the molar content of Q' is 10% to 70%, in which Q' is the group

—CH₂CH(CH₃)CH₂NCH₂CH₂NH₂
              |
              H

10. The composition according to claim 9, wherein the molar ratio of said Q' group to said acid (II) employed in said reaction is about 1:1.

11. The composition according to claim 10, wherein said silicone ionomer (A) comprise from about 5 to about 40 percent by weight of the composition.

12. The composition according to claim 6, wherein said acid (II) is sulfuric acid and said electrically non-conducting fluid (B) is a silicone oil.

13. The composition according to claim 7, wherein said acid (II) is sulfuric acid and said electrically non-conducting fluid (B) is a silicone oil.

14. The composition according to claim 8, wherein said acid (II) is sulfuric acid and said electrically non-conducting fluid (B) is a polydimethylsiloxane oil.

15. The composition according to claim 9, wherein said acid (II) is sulfuric acid and said electrically non-conducting fluid (B) is a polydimethylsiloxane oil.

16. The composition according to claim 10, wherein said acid (II) is sulfuric acid and said electrically non-conducting fluid (B) is a polydimethylsiloxane oil.

17. The composition according to claim 11, wherein said acid (II) is sulfuric acid and said electrically non-conducting fluid (B) is a polydimethylsiloxane oil.

* * * * *

UNITED STATES PATENT AND TRADEMARK OFFICE
CERTIFICATE OF CORRECTION

PATENT NO. : 4,994,198

DATED : February 19, 1991

INVENTOR(S) : Kyuha Chung

It is certified that error appears in the above-identified patent and that said Letters Patent is hereby corrected as shown below:

Delete Figures 1-10 on Sheets 1 to 3

On title page, Figure 1 is the correct drawing for this patent it should be added as shown on the attached sheet.

Signed and Sealed this

Twenty-first Day of July, 1992

Attest:

DOUGLAS B. COMER

*Attesting Officer*  *Acting Commissioner of Patents and Trademarks*